(12) United States Patent
Young et al.

(10) Patent No.: US 8,608,230 B2
(45) Date of Patent: Dec. 17, 2013

(54) LOCALIZED ENERGY DISSIPATION STRUCTURES FOR VEHICLES

(75) Inventors: Jonathan Richard Young, Dundee, MI (US); Donald James Robert Parr, San Francisco, CA (US); Ernest Matthew Villanueva, San Francisco, CA (US); Derek Paul, Menlo Park, CA (US)

(73) Assignees: Toyota Motor Engineering & Manufacturing North America, Inc., Erlanger, KY (US); Tesla Motor, Inc., Palo Alto, CA (US)

( * ) Notice: Subject to any disclaimer, the term of this patent is extended or adjusted under 35 U.S.C. 154(b) by 0 days.

(21) Appl. No.: 13/446,810

(22) Filed: Apr. 13, 2012

(65) Prior Publication Data

US 2013/0270864 A1  Oct. 17, 2013

(51) Int. Cl.
*B62D 25/02* (2006.01)

(52) U.S. Cl.
USPC ................................... 296/187.02; 296/209

(58) Field of Classification Search
USPC ............................. 296/209, 187.02; 293/102
See application file for complete search history.

(56) References Cited

U.S. PATENT DOCUMENTS

| | | | |
|---|---|---|---|
| 4,911,495 A | 3/1990 | Haga et al. | |
| 5,464,266 A | 11/1995 | Guertler | |
| 5,542,738 A | 8/1996 | Walker et al. | |
| 5,573,298 A | 11/1996 | Walker et al. | |
| 5,765,906 A | 6/1998 | Iwatsuki et al. | |
| 5,822,927 A | 10/1998 | Hellenkamp et al. | |
| 5,924,765 A * | 7/1999 | Lee | 296/209 |
| 6,325,451 B1 | 12/2001 | Sikorski | |
| 6,357,819 B1 * | 3/2002 | Yoshino | 296/187.02 |
| 6,357,822 B1 | 3/2002 | Panoz et al. | |
| 6,386,625 B1 * | 5/2002 | Dukat et al. | 296/209 |
| 7,407,219 B2 | 8/2008 | Glasgow et al. | |
| 7,537,273 B2 | 5/2009 | Lassl et al. | |
| 7,617,916 B2 | 11/2009 | Heatherington et al. | |
| 7,695,056 B2 | 4/2010 | Hanson, Jr. et al. | |
| 7,874,600 B2 | 1/2011 | Hashimura | |
| 7,992,920 B2 | 8/2011 | Deng et al. | |
| 8,127,506 B2 * | 3/2012 | Schneider et al. | 52/232 |
| 2011/0169302 A1 | 7/2011 | Deng et al. | |

FOREIGN PATENT DOCUMENTS

JP  2889162  5/1999
JP  7179185  4/2009

* cited by examiner

*Primary Examiner* — Dennis Pedder
(74) *Attorney, Agent, or Firm* — Dinsmore & Shohl LLP

(57) ABSTRACT

An impact protection structure for a vehicle impacting a blunt-object barrier includes a support structure of the vehicle, an energy absorbing rail coupled to the support structure, and a localized energy dissipation structure. The energy absorbing rail extends an energy absorbing rail length and includes a plurality of lumens. The localized energy dissipation structure extends a localized energy dissipation structure length less than the energy absorbing rail length.

13 Claims, 15 Drawing Sheets

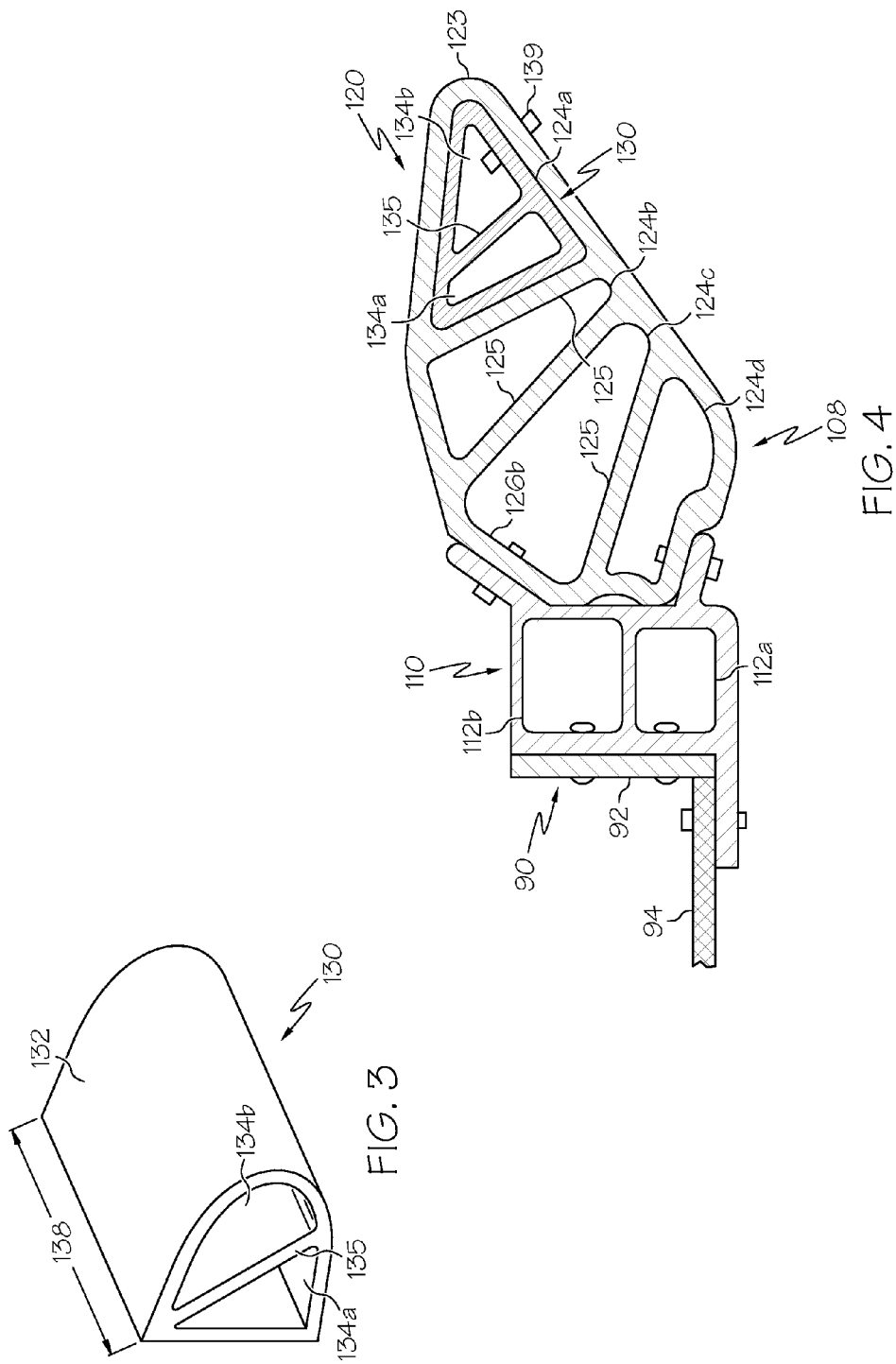

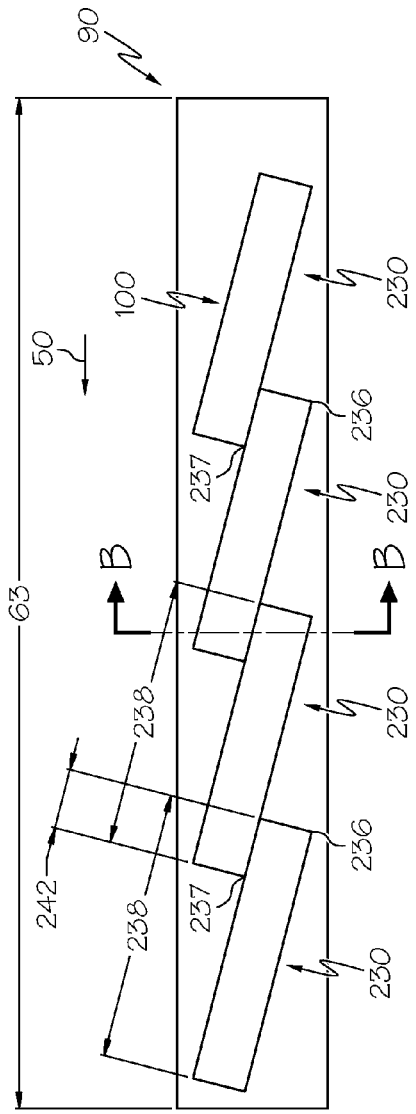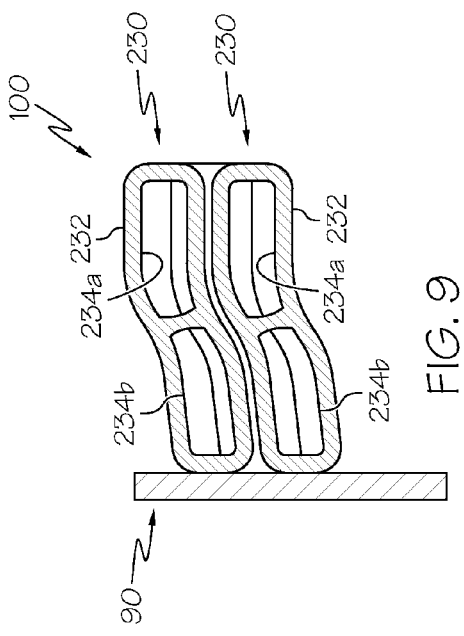
FIG. 8
FIG. 9

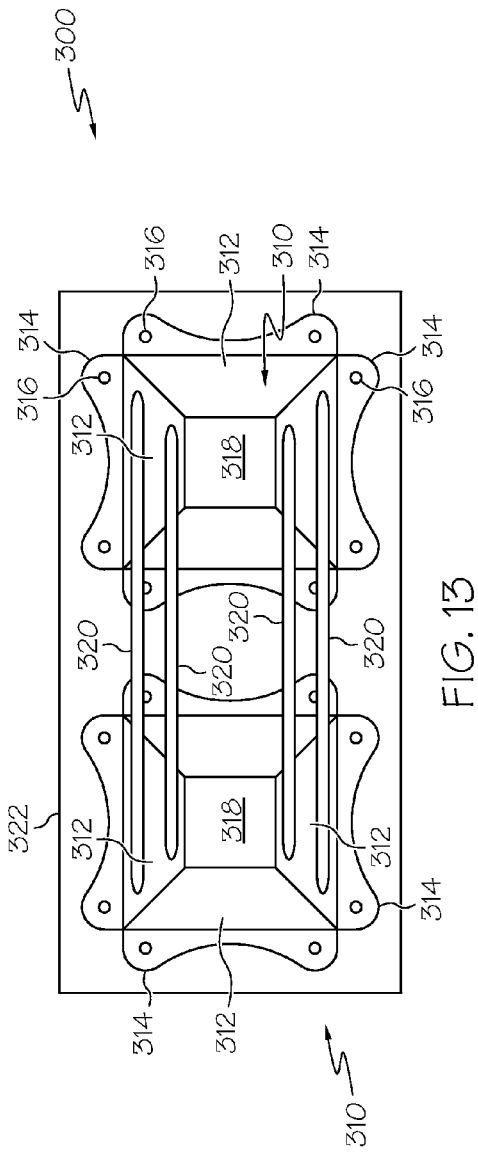
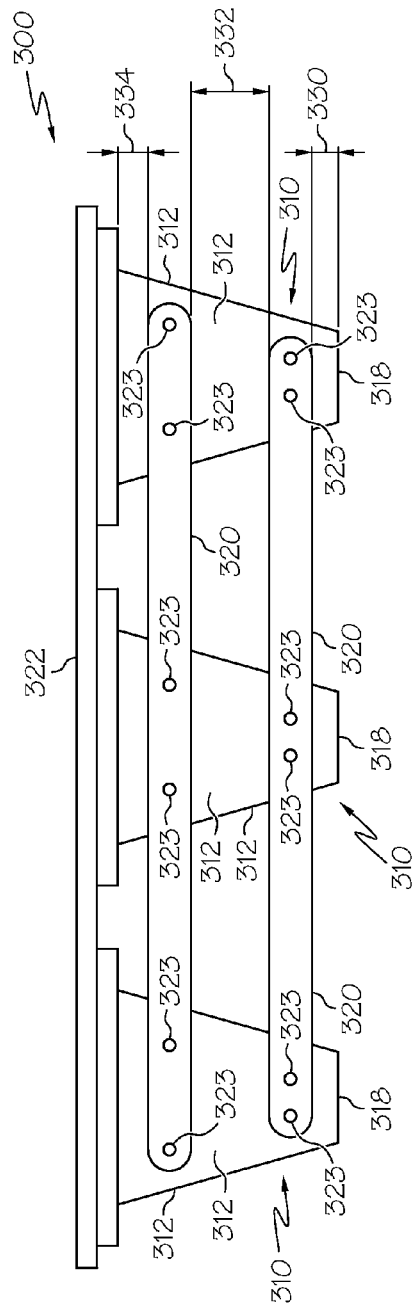

LOCALIZED ENERGY DISSIPATION STRUCTURES FOR VEHICLES

TECHNICAL FIELD

The present specification generally relates to localized energy dissipation structures for vehicles and, more specifically, to localized energy dissipation structures for vehicles that dissipate energy associated with an impact with a blunt-object barrier at discrete locations along a portion of the vehicle.

BACKGROUND

Passenger vehicles must be capable of withstanding the high forces experienced during collisions. In the United States, vehicles must comply with the Federal Motor Vehicle Safety Standards (FMVSS) and Insurance Institute for Highway Safety protocols, which describe, among other specifications, crashworthiness and vehicle integrity standards.

In addition to the standards applicable to conventional, gasoline or diesel-fueled vehicles, in electric and hybrid-electric vehicles, it is important to protect the integrity of the battery packs that are used to power the vehicle. The energy that is required to be dissipated by an impact protection structure may vary depending on the location and the orientation of the impact protection structure. Accordingly, a need exists for localized energy dissipation structures for vehicles and vehicles incorporating the same.

SUMMARY

In one embodiment, an impact protection structure for a vehicle impacting a blunt-object barrier includes a support structure of the vehicle, an energy absorbing rail coupled to the support structure, and a localized energy dissipation structure. The energy absorbing rail extends an energy absorbing rail length and includes a plurality of lumens. The localized energy dissipation structure extends a localized energy dissipation structure length less than the energy absorbing rail length.

In another embodiment, an impact protection structure for a vehicle includes a side sill of the vehicle extending a side sill distance between a front wheel well and a rear wheel well, and a plurality of localized energy dissipation structures coupled to the side sill, the localized energy dissipation structures each having a localized energy dissipation structure length less than the side sill distance.

In yet another embodiment, an impact protection structure for a vehicle includes a support structure for the vehicle, a mounting bracket coupled to the support structure, and a plurality of elongated frustums coupled to the mounting bracket. Each of the elongated frustums includes a plurality of lateral faces extending from the mounting bracket to a distal contact face, where the lateral face at the lowest vertical position is angled upwards in a direction from the mounting bracket to the distal contact face. When the elongated frustum is subject to an impact load, the elongated frustum deforms to absorb energy from the impact load.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3 schematically depicts a perspective view of a localized energy dissipation structure for an impact protection structure according to one or more embodiments shown or described herein;

FIG. 4 schematically depicts a front sectional view of an impact protection structure for a vehicle including a localized energy dissipation structure shown along line A-A of FIG. 1 according to one or more embodiments shown or described herein;

FIG. 8 schematically depicts a partial side view of a vehicle having an impact protection structure positioned along the side of the vehicle according to one or more embodiments shown or described herein;

FIG. 9 schematically depicts a front sectional view of an impact protection structure for a vehicle including a localized energy dissipation structure along line B-B of FIG. 7 according to one or more embodiments shown or described herein;

FIG. 13 schematically depicts a front view of an impact protection structure for a vehicle according to one or more embodiments shown or described herein;

FIG. 14 schematically depicts a top view of an impact protection structure for a vehicle according to one or more embodiments shown or described herein;

DETAILED DESCRIPTION

Figure 1:
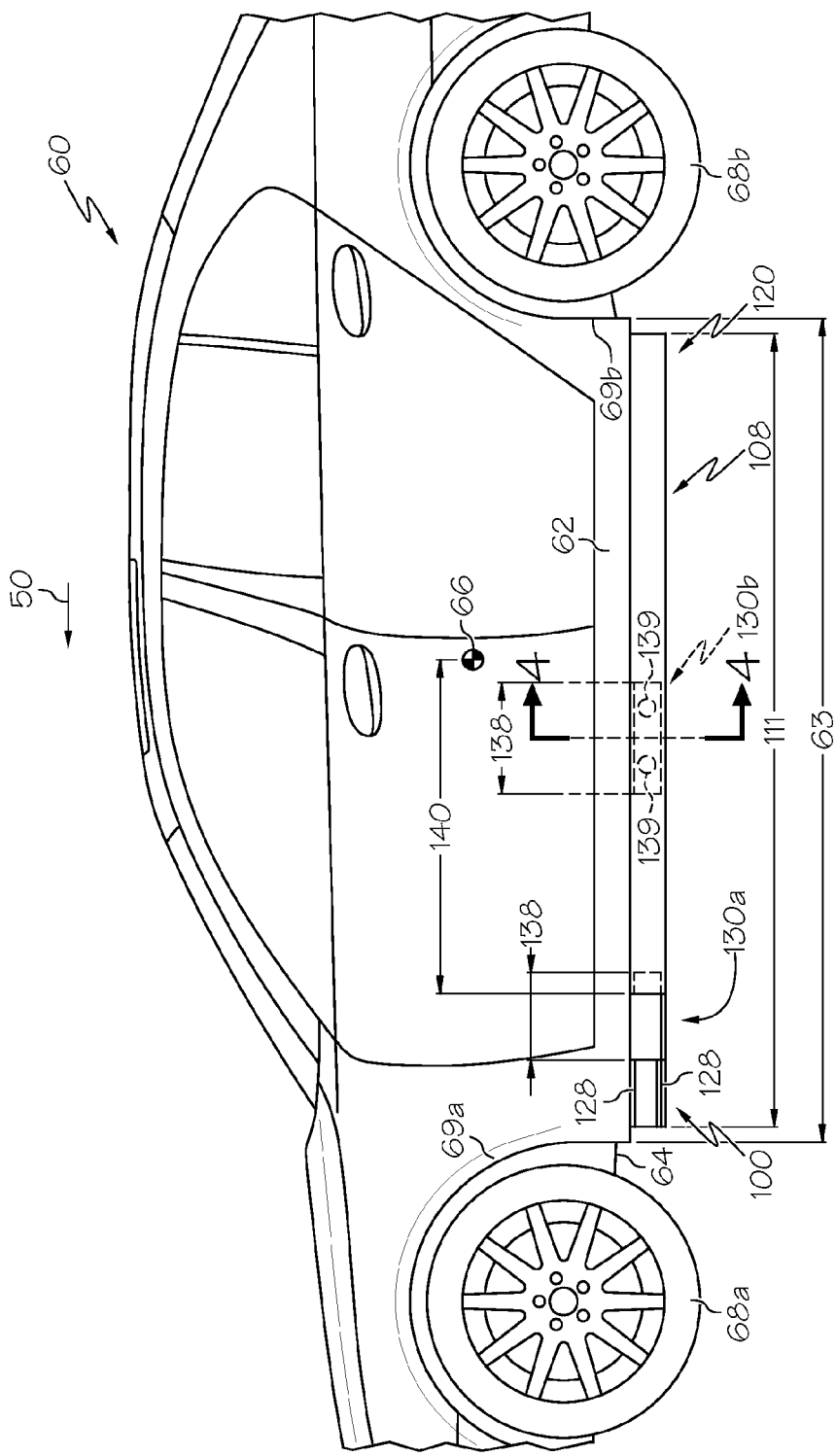
FIG. 1 schematically depicts a partial side view of a vehicle having an impact protection structure positioned along the side of the vehicle according to one or more embodiments shown or described herein.
Figure 2:
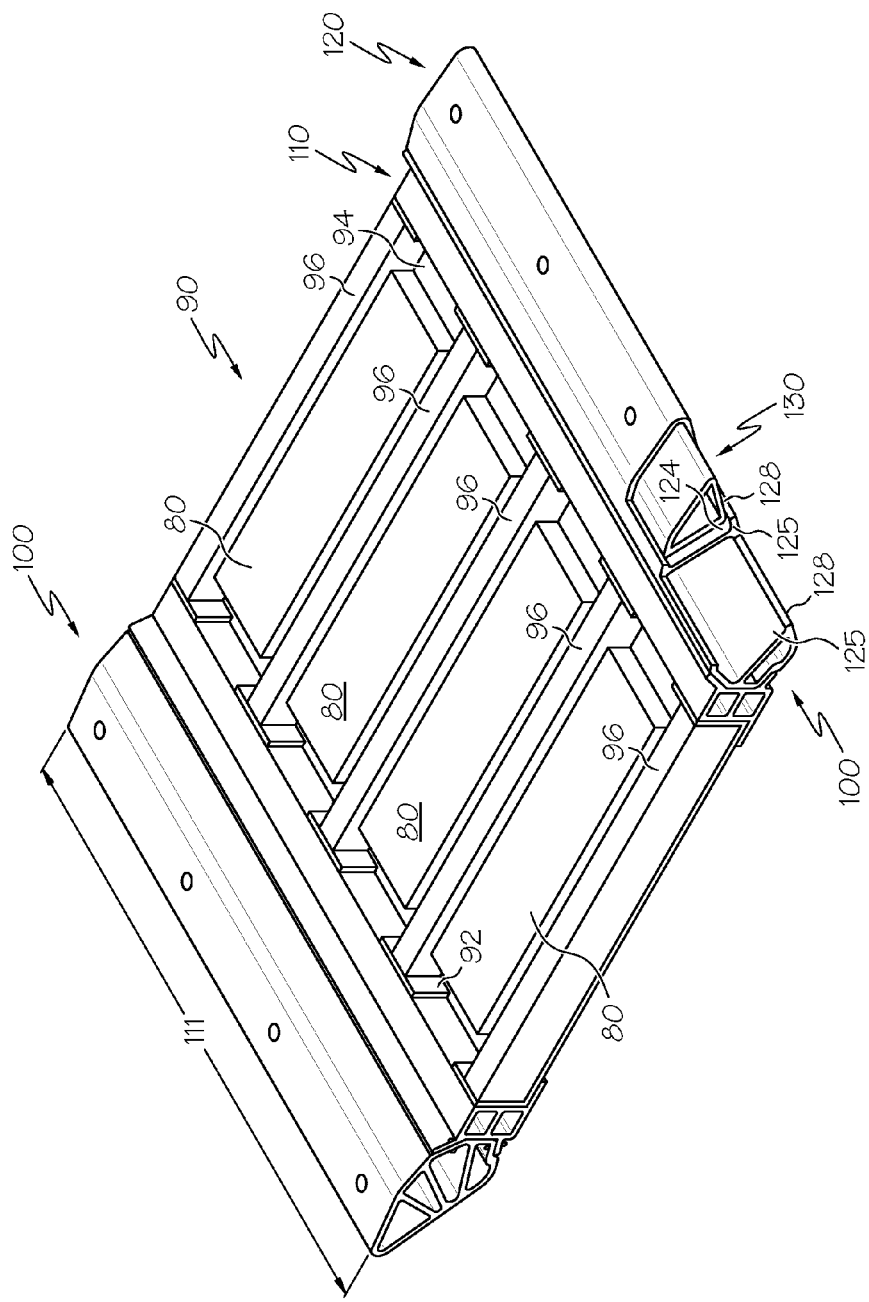
FIG. 2 schematically depicts a perspective view of a support structure and impact protection structures for a vehicle according to one or more embodiments shown or described herein.

FIGS. 1 and 2 generally depict vehicles incorporating impact protection structures that deform when impacted by a blunt-object barrier and limit damage to the vehicle from the blunt-object barrier. The impact protection structures deform when impacted by the blunt-object barrier, such that the impact protection structures absorb energy associated with the impact and prevent that energy from being transferred to the vehicle and/or the support structure of the vehicle. The impact protection structures include localized energy dissipation structures that extend a distance less than a distance the impact protection structures extend along the side sills of the vehicle. The localized energy dissipation structures allow placement of further impact protection structures in regions of low clearance and/or in discrete locations where additional impact protection is desired. The impact protection structures and vehicles incorporating the same will be described in more detail herein with specific reference to the appended drawings.

Referring now to FIG. 1, a partial side view of a vehicle 60 is depicted. The vehicle 60 includes a side sill 62 that extends along one side of the vehicle 60 from the front wheel 68a to the rear wheel 68b a side sill length 63. The vehicle 60 includes a corresponding side sill 62 along the opposite side of the vehicle 60 (not shown). An impact protection structure 100 is positioned along a side of the vehicle 60. The impact protection structure 100 is coupled to a support structure of the vehicle. As used herein, the phrase "support structure" may refer to a battery support tray (as described below), a vehicle frame or unibody 64 of the vehicle 60.

Referring now to FIGS. 1 and 2, a battery support tray 90 of a vehicle 60 is depicted. The battery support tray 90 includes a plurality of cross-support members 96 that are coupled to a tray floor 94. The cross-support members 96 may be coupled to end plates 92 positioned at the ends of the cross-support members 96 for attachment to the impact protection structures 100. The cross-support members 96 may be constructed to satisfy the requirements of stiffness and strength to provide support to the impact protection structure 100 during an impact event, as described below. In one embodiment, the cross-support members 96 include a plurality of components that are attached to each other. The cross-support members 96 may include hollow lumens arranged through their thickness. The cross-support members 96 may be made from a variety of materials including, without limitation, extruded aluminum alloy channels and steel channels.

In some embodiments, the impact protection structures 100 may be attached to both the vehicle frame or unibody 64 and the battery support tray 90. In other embodiments, the impact protection structures 100 may be secured directly to the battery support tray 90 without the impact protection structures 100 being attached to the vehicle frame or unibody 64.

While specific mention is made to the use of impact protection structures 100 with battery support trays 90 for electric or hybrid-electric vehicles, it should be understood that impact protection structures 100 according to the present disclosure may be used in conjunction with conventional, gasoline or diesel-fueled vehicles.

The impact protection structure 100 includes an energy absorbing rail 108. In some embodiments, the energy absorbing rail 108 includes an interior rail 110 coupled to the battery support tray 90 and an exterior rail 120 coupled to the interior rail 110. In other embodiments, the energy absorbing rail 108 is a single, integral rail. As depicted in FIG. 2, both the interior rail 110 and the exterior rail 120 include multi-lumen structures. The lumens 124 of the exterior rail 120 are separated by exterior rail septa 125, as will be described in greater detail below. The interior and exterior rail 110, 120 may be extruded such that the wall thicknesses of the interior and exterior rails 110, 120 are generally uniform along a length 111 of the energy absorbing rail 108.

As depicted in FIG. 1, the impact protection structure 100 is coupled to the underside of the vehicle 60. A portion of the exterior rail 120 and the localized energy dissipation structure 130 of the impact protection structure 100 may be visible along the side of the vehicle 60. For example, in the embodiment depicted in FIG. 1, a portion of the exterior rail 120 is visible below the side sill 62 of the vehicle 60. However, in alternate embodiments, the impact protection structure 100 may be completely visible or completely shielded from view by trim or body components of the vehicle 60.

It should be understood that the battery support tray 90 may be modular and interchangeable for use in a variety of vehicle platforms. The interchangeability of the battery support tray 90 across a variety of vehicle platforms may allow the battery support tray 90 to be used across multiple vehicle lines, which may decrease costs associated with development and/or production of the vehicle 60. The impact protection structure 100, including the interior rail 110 and the exterior rail 120, may be designed to suit particular vehicle layout requirements, for example, by accommodating the packaging constraints of the particular vehicle and providing the desired side impact protection, while continuing to use the interchangeable battery support tray 90.

In certain end-user applications, components of the vehicle 60 may prevent installation of the impact protection structures 100 along an entire characteristic distance of the vehicle 60, for example along the entire side sill 62 of the vehicle 60. For example, suspension components (not shown) of the vehicle 60 that secure the wheels 68a, 68b to the vehicle frame or unibody 64 may require clearance in locations proximate to the impact protection structures 100 for installation and/or range of motion purposes. Accordingly, portions of the interior and/or exterior rails 110, 120 of the impact protection structures 100 may be removed from the interior and/or exterior rails 110, 120 to form relief zones 128 in the impact protection structures 100. As depicted in FIGS. 1 and 2, the relief zones 128 are formed by removing a portion of the exterior rail 120 to expose a septum 125 of the exterior rail 120. The relief zones 128 extend into the exterior rail 120 of the energy absorbing rail 108 and are positioned proximate to the wheels 68a, 68b of the vehicle 60.

The energy absorbing capacity of the energy absorbing rail 108 at positions of the relief zones 128 (depicted in FIGS. 1 and 2 as being positioned at the furthest distance from the center of gravity 66 of the vehicle 60 in a forward direction 50 towards the front wheel 68a) are reduced compared with the energy absorbing capacity of the energy absorbing rail 108 at positions away from the relief zones 128. However, the relief zones 128 are positioned at an offset distance 140 in an offset direction (i.e., in the forward direction 50) from the center of gravity 66 of the vehicle 60. In an impact event where a blunt-object barrier contacts the vehicle 60 at a position away from the center of gravity 66, the vehicle 60 will tend to rotate the vehicle around the blunt-object barrier. The rotation of the vehicle 60 around the blunt-object barrier reduces the energy that is transferred to the impact protection structure 100 because the impact causes the force to be applied in an oblique direction instead of normal to impact protection structure 100. As such, energy dissipation requirements of the impact protection structure 100 are generally lower at locations away from the center of gravity 66 of the vehicle 60. Further, at locations of the impact proximate to the relief zones 128, other vehicle structures such as body panels, door panels, and portions of the vehicle frame or unibody 64 may dissipate energy associated with an impact with a blunt-object barrier. Thus, the required energy dissipation of the energy absorbing rail 108 at positions proximate to the relief zones 128 may be reduced.

Figure 5:
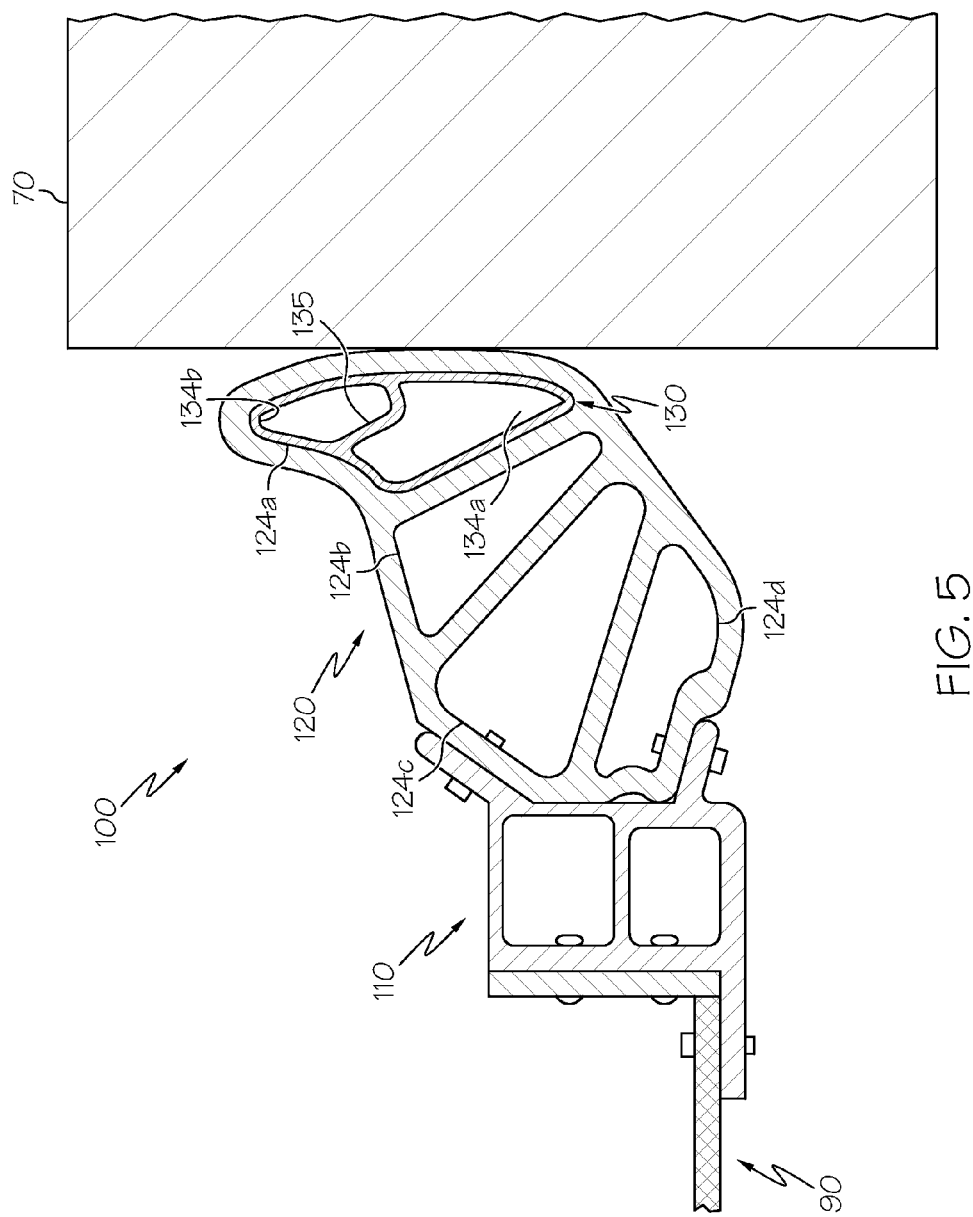
FIG. 5 schematically depicts a front sectional view of the impact protection structure including a localized energy dissipation structure of FIG. 4 along line A-A of FIG. 1 shown after impact with a blunt-object barrier.

As used herein, "blunt-object barrier" 70 (as depicted in FIG. 5) refers to a pole-like barrier used in testing according to FMVSS 201 and 214. Such a pole-like barrier simulates vehicle impact with telephone poles, trees, concrete posts, and the like. However, impact protection structures 100 according to the present disclosure may be utilized to resist impact by a variety of blunt-objects including real-world impacts.

Still referring to FIGS. 1 and 2, a localized energy dissipation structure 130a is positioned within the relief zones 128 of the energy absorbing rail 108. As illustrated, the localized energy dissipation structure 130 is positioned adjacent to an opening created in a lumen 124 by the relief zone 128. By positioning the localized energy dissipation structure 130 within the relief zone 128, additional side impact protection can be provided to the vehicle 60 at locations proximate to the relief zones 128 without increasing the overall size of the impact protection structure 100. Such a localized energy dissipation structure 130 may allow for installation of various vehicle components and provide access for later maintenance of vehicle components, for example, maintenance of the battery packs 80 secured within the battery support tray 90 of the vehicle 60.

Referring now to FIG. 3, one embodiment of the localized energy dissipation structure 130 is depicted. The localized energy dissipation structure 130 includes an exterior profile 132 that generally corresponds to the interior profile of one of the lumens 124 of the energy absorbing rail 108. The exterior profile 132 of the localized energy dissipation structure 130 allows for a close fit between the localized energy dissipation structure 130 and the energy absorbing rail 108. The localized energy dissipation structure 130 may be a multi-lumen structure, for example, having a first and a second localized lumen 134a, 134b that extend along a localized energy dissipation structure length 138, which are separated by a septum 135. By incorporating a first and second localized lumen 134a, 134b, the localized energy dissipation structure 130 may have an increased resistance to buckling when a load is applied to the localized energy dissipation structure 130 than a localized energy dissipation structure that does not incorporate a first and second localized lumen 134a, 134b.

The impact protection structure 100, including the energy absorbing rail 108 and the localized energy dissipation structure 130 may be made from a variety of materials including, for example, alloys of aluminum or steel. Some components of the impact protection structure 100 may be formed in an extrusion process such that the components have generally uniform wall thicknesses along their lengths. Alternatively, some components of the impact protection structure 100 may be fabricated as separate components that are secured to one another with mechanical fasteners (not shown). The mechanical fasteners may be, but are not limited to, pop rivets, solid core rivets, or self piercing rivets made from a variety of materials including, but not limited to, alloys of aluminum or steel. The mechanical fasteners may also be bolts and nuts or screws. The components of the impact protection structure 100 may also be secured to one another by a structural adhesive, for example an epoxy or an acrylic resin. Alternatively, or in addition, components of the impact protection structure 100 may be fabricated through a joining process, for example welding, including resistance spot welding, friction stir welding, gas tungsten arc welding, gas metal arc welding, or brazing, such that the components of the impact protection structure 100 are weldments.

Referring again to FIG. 1, another embodiment of the localized energy dissipation structure 130b is depicted, where the localized energy dissipation structure 130 is located internally to the energy absorbing rail 108. The localized energy dissipation structure 130b includes a localized energy dissipation structure length 138 that is less than the length 111 of the interior and/or exterior rails 110, 120 of the energy absorbing rail 108. The localized energy dissipation structure 130 is positioned along the energy absorbing rail 108 at a location where additional impact protection is desired. The localized energy dissipation structure 130b is coupled to the energy absorbing rail 108 at a plurality of securement positions 139 along the localized energy dissipation structure length 138. The plurality of securement positions 139 may be spaced apart from one another at interstitial positions between the securement positions 139.

Referring to FIG. 4, an embodiment of the localized energy dissipation structure 130 positioned internally to an enclosed lumen 124a of the energy absorbing rail 108 is depicted. In this embodiment, the energy absorbing rail 108 includes an interior rail 110 coupled to both the end plates 92 and the tray floor 94 of the battery support tray 90. The interior rail 110 is a multi-lumen structure having a first and second interior lumen 112a, 112b. The energy absorbing rail 108 also includes an exterior rail 120 coupled to the interior rail 110. In the depicted embodiment, the exterior rail 120 includes a first, second, third, and fourth exterior lumen 124a, 124b, 124c, 124d, each separated from one another by an exterior rail septum 125. The localized energy dissipation structure 130 is positioned within the first exterior lumen 124a at a pre-determined position along the length of the exterior rail 120.

The localized energy dissipation structure 130 is coupled to the exterior rail 120 of the energy absorbing rail 108 at a plurality of securement positions 139. In some embodiments, the localized energy dissipation structure 130 and the energy absorbing rail 108 are secured to one another with mechanical fasteners. The mechanical fasteners may be, but are not limited to, pop rivets, solid core rivets, or self piercing rivets made from a variety of materials including, but not limited to, alloys of aluminum or steel. The mechanical fasteners may also be bolts and nuts or screws. The localized energy dissipation structure 130 may also be secured to the energy absorbing rail 108 by a structural adhesive, for example an epoxy or an acrylic resin. Alternatively, or in addition, the localized energy dissipation structure 130 may be secured to the energy absorbing rail 108 through a joining process, for example welding, including resistance spot welding, friction stir welding, gas tungsten arc welding, gas metal arc welding, or brazing.

The interior rail 110 and the exterior rail 120 including the localized energy dissipation structure 130 each have an associated interior buckling load limit or exterior buckling load limit. The interior or exterior buckling load limit, as used herein, refers to the maximum load that can be applied to the interior rail 110 or the exterior rail 120 before one of the lumens loses stability and collapses in an inboard direction. The buckling load limit of any of the interior lumens 112a, 112b or the exterior lumens 124a, 124b, 124c, 124d may be simulated computationally, for example, using a non-linear finite element analysis program. The buckling load limit of the lumens may be approximated by calculating the bending strength of each of the lumens when a force is applied to the exterior rail 120 in an inboard direction. The buckling load limit of any of the lumens, and therefore the interior rail 110 and exterior rail 120, may be affected by the shape and thickness of the walls surrounding the lumens.

Referring now to FIG. 5, the energy absorbing rail 108 of FIG. 4 is depicted undergoing an impact event with a blunt-object barrier 70. As depicted in FIG. 5, as the exterior rail 120 contacts the blunt-object barrier 70, the first exterior lumen 124a buckles as the buckling load limit of the first exterior lumen 124a is exceeded. In addition, because the localized energy dissipation structure 130 is positioned within the first exterior lumen 124a of the exterior rail 120, as the first exterior lumen 124a deforms, the localized energy dissipation structure 130 deforms. The buckling of the localized energy dissipation structure 130 increases the energy dissipated at the contact zone along the energy absorbing rail 108, thereby reducing the energy caused by the impact event between the energy absorbing rail 108 and the blunt-object barrier 70. The increase in energy dissipation by the localized energy dissipation structure 130 may decrease the energy due to the impact event that is transferred towards the battery support tray 90, thereby reducing the likelihood of damage to the battery packs (not shown).

In the embodiment depicted in FIGS. 4 and 5, the buckling load limit of the exterior rail 120 is less than the buckling load limit of the interior rail 110. As such, the exterior rail 120, including the localized energy dissipation structure 130, buckles before the interior rail 110. By preferentially buckling the exterior rail 120 before the interior rail 110, the deformation of the energy absorbing rail 108 may be controlled such that the deformed shape of the energy absorbing rail 108 does not induce an unsustainable moment load into the end plates 92 or tray floor 94 of the battery support tray 90.

In the embodiment depicted in FIGS. 4 and 5, the localized energy dissipation structure 130 increases the energy dissipation of the impact protection structure 100 at a discrete location along the length 111 of the interior and exterior rails 110, 120. The localized energy dissipation structure 130 may provide a comparable energy dissipation to an exterior rail 120 having an increased wall thickness along the entire length 111 of the exterior rail 120, but without incurring the increase in weight associated with an increase in wall thickness along the entire length 111. Thus, the localized energy dissipation structure 130 may dissipate energy more efficiently in regard to weight than an increase in wall thickness along the entire length 111 of the exterior rail 120.

Figure 6:
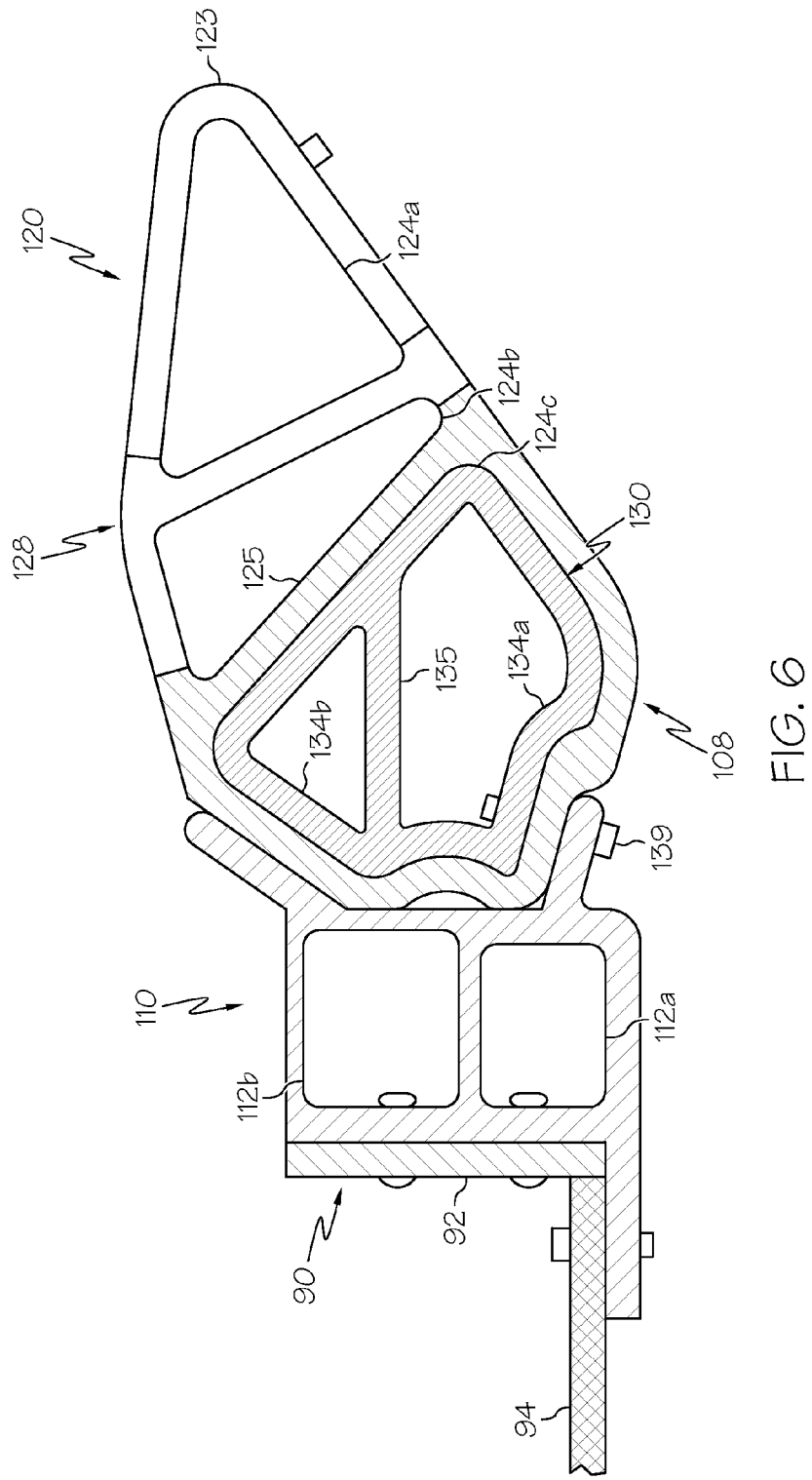
FIG. 6 schematically depicts a front sectional view of an impact protection structure for a vehicle including a localized energy dissipation structure shown along line A-A of FIG. 1 according to one or more embodiments shown or described herein.

Referring now to FIG. 6, another embodiment of the impact protection structure 100 is depicted. In this embodiment, portions of the exterior rail 120 have been removed, as described above, exposing the exterior rail septum 125 separating the second exterior lumen 124b from the third exterior lumen 124c, thereby forming a relief zone 128 in the exterior rail 120. The localized energy dissipation structure 130 is a multi-lumen structure having a first and second localized lumens 134a, 134b that are separated from one another by a septum 135. The localized energy dissipation structure 130 is positioned proximate to the relief zone 128 within the third exterior lumen 124c, which remains enclosed. The localized energy dissipation structure 130 extends along the exterior rail 120 a partial distance less than the length 111 of the exterior rail 120. The localized energy dissipation structure 130 depicted in FIG. 6 provides additional strength to the exterior rail 120 that increases the energy dissipation capability of the exterior rail 120. Further, by positioning the localized energy dissipation structure 130 within the third exterior lumen 124c, the impact protection structure 100 exhibits an enhanced energy dissipation capability without increasing the size of the exterior rail 120.

Figure 7:
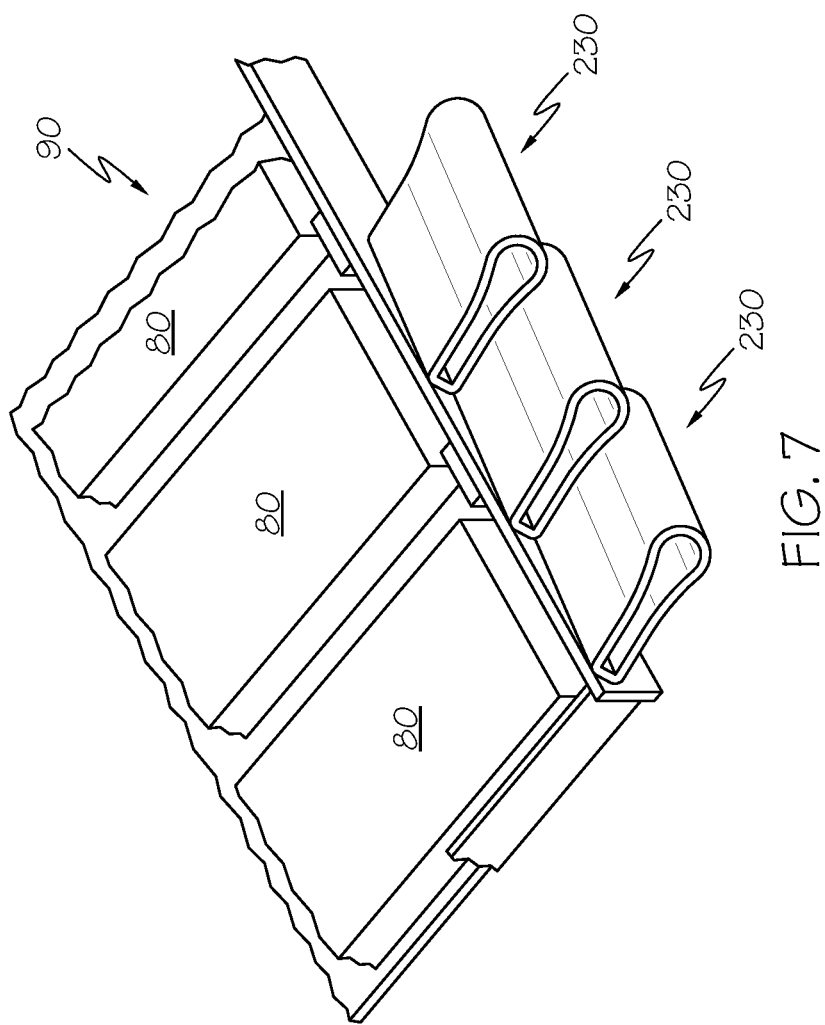
FIG. 7 schematically depicts a perspective view of a battery support tray and impact protection structures for a vehicle according to one or more embodiments shown or described herein.

Referring now to FIGS. 7-9, another embodiment of the impact protection structure 100 including a plurality of localized energy dissipation structures 230 is depicted. In this embodiment, the localized energy dissipation structures 230 are coupled to the battery support tray 90 of the vehicle. Each of the localized energy dissipation structures 230 has a localized energy dissipation structure length 238 that is less than the side sill length 63 extending from the front wheel well 69a to the rear wheel well 69b of the vehicle 60, as depicted in FIG. 1. The localized energy dissipation structures 230 are positioned along the battery support tray 90 such that the plurality of localized energy dissipation structures 230 provides impact protection to the battery support tray 90, and therefore the vehicle 60, along the entire side sill length 63.

In the embodiment depicted in FIGS. 7-9, adjacent localized energy dissipation structures 230 are overlapped with one another along the length 138 of the localized energy dissipation structures 230. Accordingly, the exterior contour 232 of the localized energy dissipation structures 230 may be shaped such that the top and the bottom of the localized energy dissipation structures "nest" with one another, as depicted in FIG. 9. As depicted in FIG. 8, the localized energy dissipation structures 230 may be biased relative to the battery support tray 90 such that a rearward portion 236 of a first localized energy dissipation structure 230 is positioned a vertical distance below a forward portion 237 of a second localized energy dissipation structure 230, where the first localized energy dissipation structure 230 is positioned in a forward direction 50 of the second localized energy dissipation structure 230. Such positioning of the localized energy dissipation structures 230 may create an "offset nesting" arrangement that increases the protection to an impact event with a blunt-object barrier 70 by increasing the available localized energy dissipation structures 230 to absorb the impact. The offset nesting arrangement may also be helpful in shedding debris such as water, snow, and road grime from the impact protection structure 100. The localized energy dissipation structures 230 may include weep holes to shed debris that collects inside the localized energy dissipation structures 230. In some embodiments, the overlap distance 242 of adjacent localized energy dissipation structures 230 may be from about 20% to about 70% of the length 238 of the localized energy dissipation structure. In a particular embodiment, the overlap distance 242 of adjacent energy dissipation structures 230 may be about 50% of the length 238 of the localized energy dissipation structure.

While the localized energy dissipation structures 230 depicted in FIG. 8 are depicted to contact one another, it should be understood that the localized energy dissipation structures 230 may be spaced apart from one another to provide clearance to shed debris such as water, snow, road grime, and the like.

Referring now to FIG. 9, the localized energy dissipation structures 230 may be a multi-lumen structure that includes a first and a second lumen 234a, 234b. The first and second lumens 234a, 234b may be positioned within the localized energy dissipation structures 230 to provide a pre-determined buckling load limit, based on the end-user application.

When a vehicle 60 having the localized energy dissipation structure 230 is subject to an impact load from a blunt-object barrier, the localized energy dissipation structures 230 proximate to the blunt-object barrier contact the blunt-object barrier and being to deform. As the localized energy dissipation structures 230 elastically and/or plastically deform, the load applied to the localized energy dissipation structures 230 exceeds the buckling load limit of the localized energy dissipation structures 230, causing the localized energy dissipation structures 230 to buckle due to the compressive stresses applied by the blunt-object barrier. Because the localized energy dissipation structures 230 are coupled to the battery support tray 90 independently of one another, one of the localized energy dissipation structures 230 may buckle, while an adjacent localized energy dissipation structure 230 does not.

Figure 10:
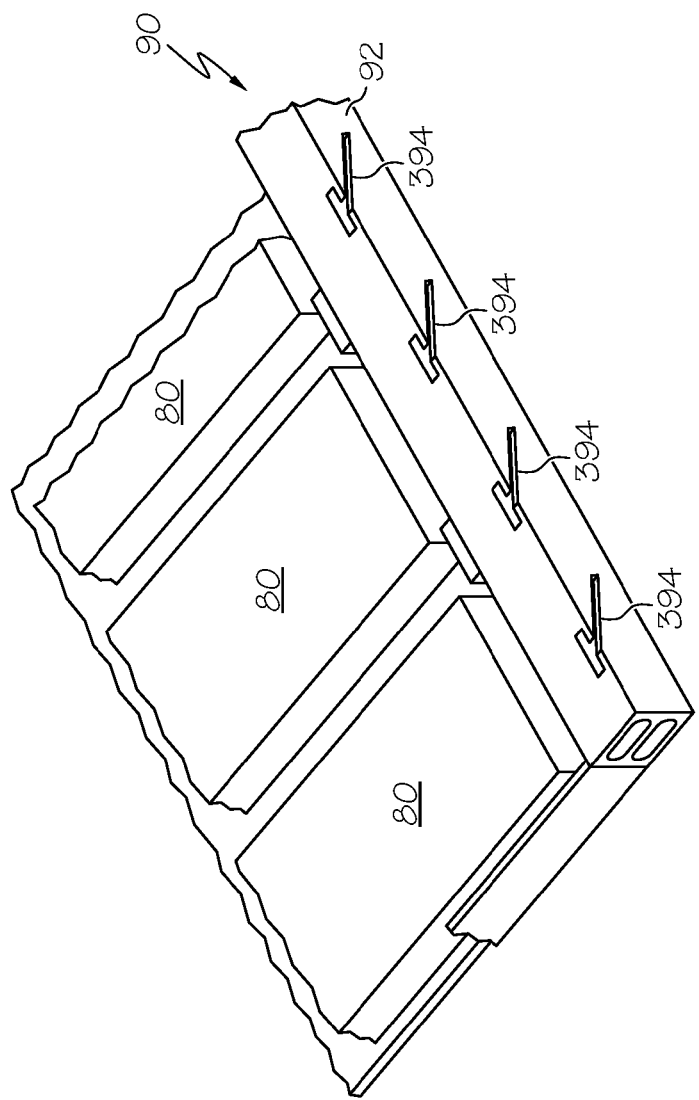
FIG. 10 schematically depicts a perspective view of a battery support tray for a vehicle according to one or more embodiments shown or described herein.
Figure 11:
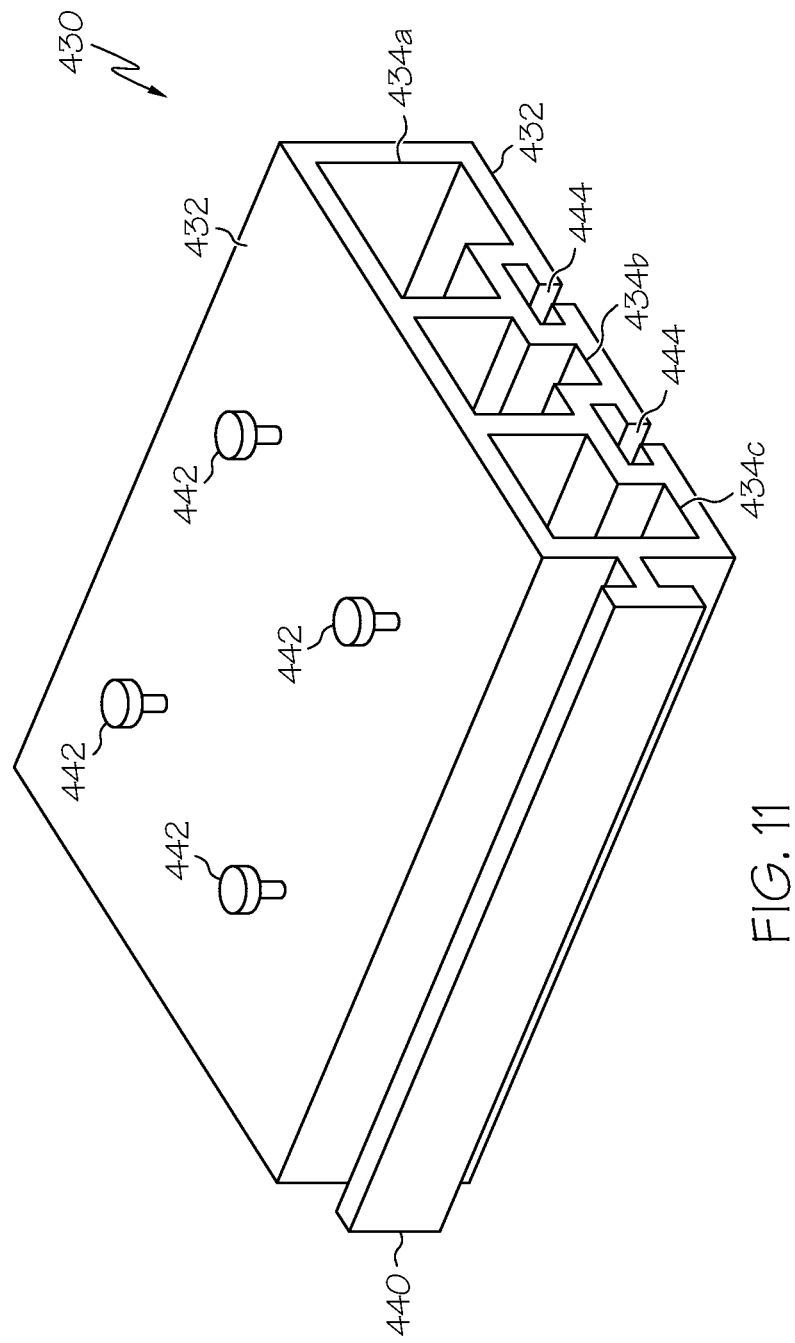
FIG. 11 schematically depicts a perspective view of a localized energy dissipation structure for a vehicle according to one or more embodiments shown or described herein.

Referring now to FIGS. 10 and 11, components of another embodiment of the battery support tray 90 and localized energy dissipation structures 430 are depicted. Referring now to FIG. 10, the end plates 92 of the battery support tray 90 include locating slots 394. The locating slots 394 extend a partial distance along the side of the battery support tray 90. Referring now to FIG. 11, each of the plurality of localized energy dissipation structures 430 include a support tab 440 that extends away from the plurality of localized lumens 434a, 434b, 434c. The exterior contour 432 of the localized energy dissipation structures 430 is shaped to allow the localized energy dissipation structures 430 to "nest" with one another. When the localized energy dissipation structures 430 are installed in position on the battery support tray 90, the support tabs 440 of the localized energy dissipation structures 430 are inserted into the locating slots 394 of the end plates 92. By positioning the support tabs 440 in the locating slots 394, the position and orientation of the plurality of localized energy dissipation structures 430 can be maintained relative to the battery support tray 90 and to each other.

Still referring to FIG. 11, the localized energy dissipation structures 430 may include interlocking tabs 442 extending from one of the top or the bottom surface of the localized energy dissipation structure 430 (depicted in FIG. 11 as extending from the top surface of the localized energy dissipation structure 430), and interlocking slots 444 that extend along one of the bottom surface or the top surface of the localized energy dissipation structure 430 (depicted in FIG. 11 as extending from the bottom surface of the localized energy dissipation structure 430). When the localized energy dissipation structures 430 are assembled in position on the battery support tray 90, the interlocking tabs 442 are positioned within the interlocking slots 444 such that adjacent localized energy dissipation structures 430 are interlocked with one another. Interlocking of adjacent localized energy dissipation structures 430 may assist with dissipating energy associated with impact with a blunt-object barrier. For example, when one of the localized energy dissipation structures 430 is impacted by a blunt-object barrier, the interlocking tabs 442 and the interlocking slots 444 may transfer energy from the localized energy dissipation structure 430 absorbing the majority of the energy from the impact to adjacent localized energy dissipation structures 430.

Figure 12:
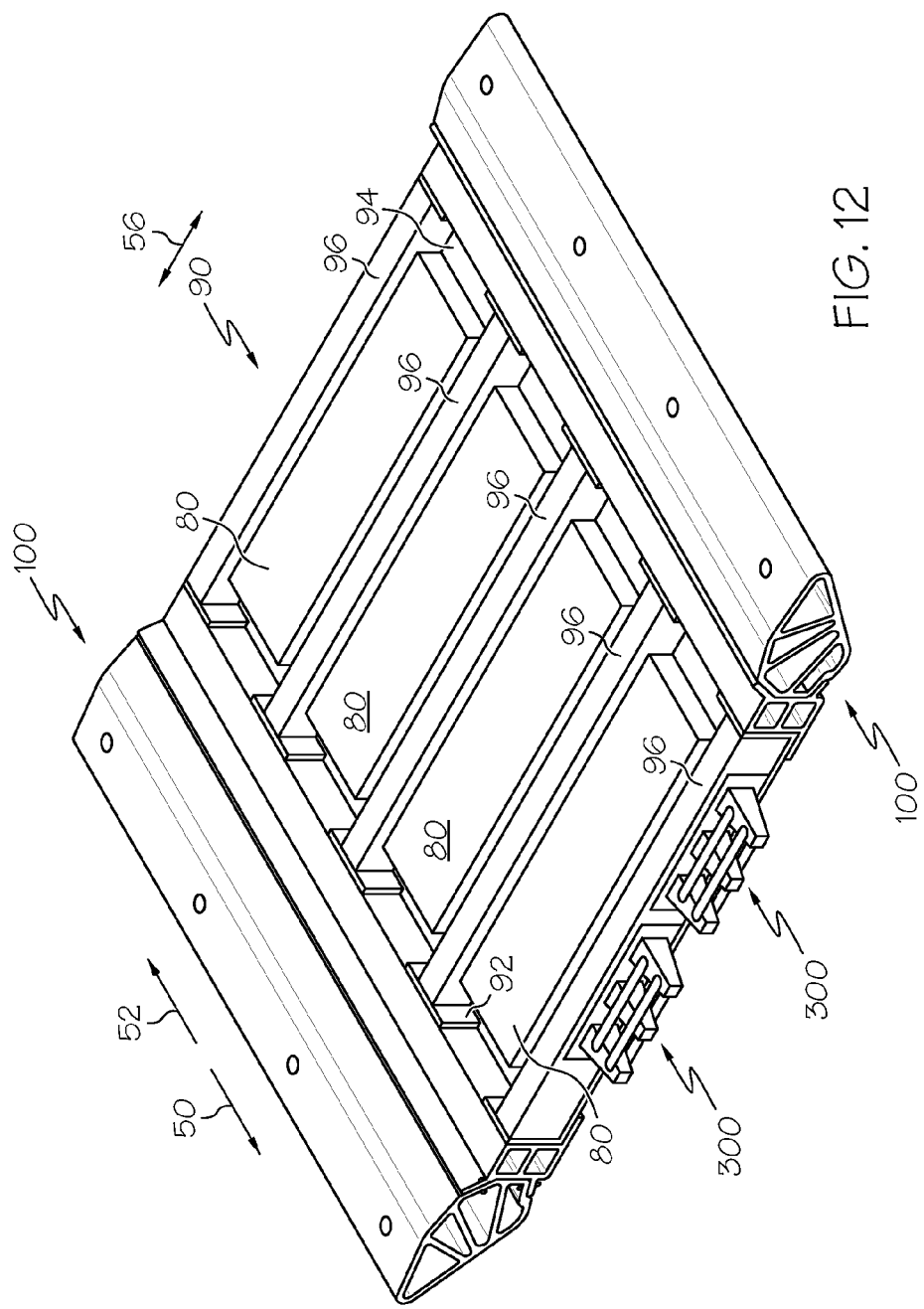
FIG. 12 schematically depicts a perspective view of a battery support tray and impact protection structures for a vehicle according to one or more embodiments shown or described herein.

Referring now to FIGS. 12-17, another embodiment of the impact protection structure 300 for a vehicle is depicted. In this embodiment, the impact protection structure 300 includes a plurality of elongated frustums 310 coupled to the battery support tray 90 of the vehicle. As depicted in FIG. 12, the impact protection structures 300 are coupled to the battery support tray 90 such that the elongated frustums 310 extend in the forward direction 50 of the vehicle. However, it should be understood that the impact protection structures 300 may be positioned such that the elongated frustums 310 extend in a rearward direction 52 as well as in one of the lateral directions 56 of the vehicle.

Referring now to FIGS. 13 and 14, the elongated frustums 310 of the impact protection structure 300 have a truncated-pyramid shape that includes a plurality of lateral faces 312 that extend outwards to a distal contact face 318. While the elongated frustums 310 depicted include four lateral faces 312, it should be understood that the elongated frustums 310 may include any of a number of lateral faces 312 geometrically arranged, including an elongated frustum 310 having a cone-like shape and, therefore, a single lateral face 312. The lateral faces 312 extend away from the distal contact face 318 to mounting flanges 314. The mounting flanges 314 of the elongated frustum 310 are coupled to a mounting bracket 322. The mounting flanges 314 may include a plurality of positioning datums 316 that assist with alignment of the elongated frustum 310 to the mounting bracket 322.

The impact protection structure 300 may also include a plurality of tie straps 320 that are coupled to adjacent elongated frustums 310. The tie straps 320 distribute load associated with an impact event with a blunt-object barrier 70 (not shown) away from the point of impact with the distal contact face 318 to adjacent elongated frustums 310, thereby distributing the load and stabilizing the elongated frustums 310 and enhancing performance of the impact protection structure 300. The tie straps 320 may extend along a majority of the lateral faces 312 of the elongated frustums 310. The tie straps 320 may be coupled to the elongated frustums 310 at a plurality of attachment points 323. The tie traps 320 may be coupled to the elongated frustums 310 at the attachment points 323 by mechanical fasteners, structural adhesive, structural spot welds, or a combination thereof.

In the embodiment depicted in FIGS. 12-14, the lateral face 312 of the elongated frustum 310 that is at the lowest vertical position is angled upwards from the mounting bracket 322 to the distal contact face 318. The angled orientation of the lowest vertically positioned lateral face 312 may assist with shedding debris such as water, snow, road grime, and the like, from the impact protection structure 300.

The elongated frustum 310 may be fabricated using a variety of techniques including deep-draw stamping, hydroforming, and/or sheet metal bending and welding, such that the elongated frustums 310 include weldments. In some embodiments, the interior volume of the elongated frustums 310 defined by the lateral faces 312, the distal contact face 318, and the mounting flanges 314 may be hollow. In other embodiments, the interior volume of the elongated frustums 310 may be filled with an energy absorbing material.

Figure 15:
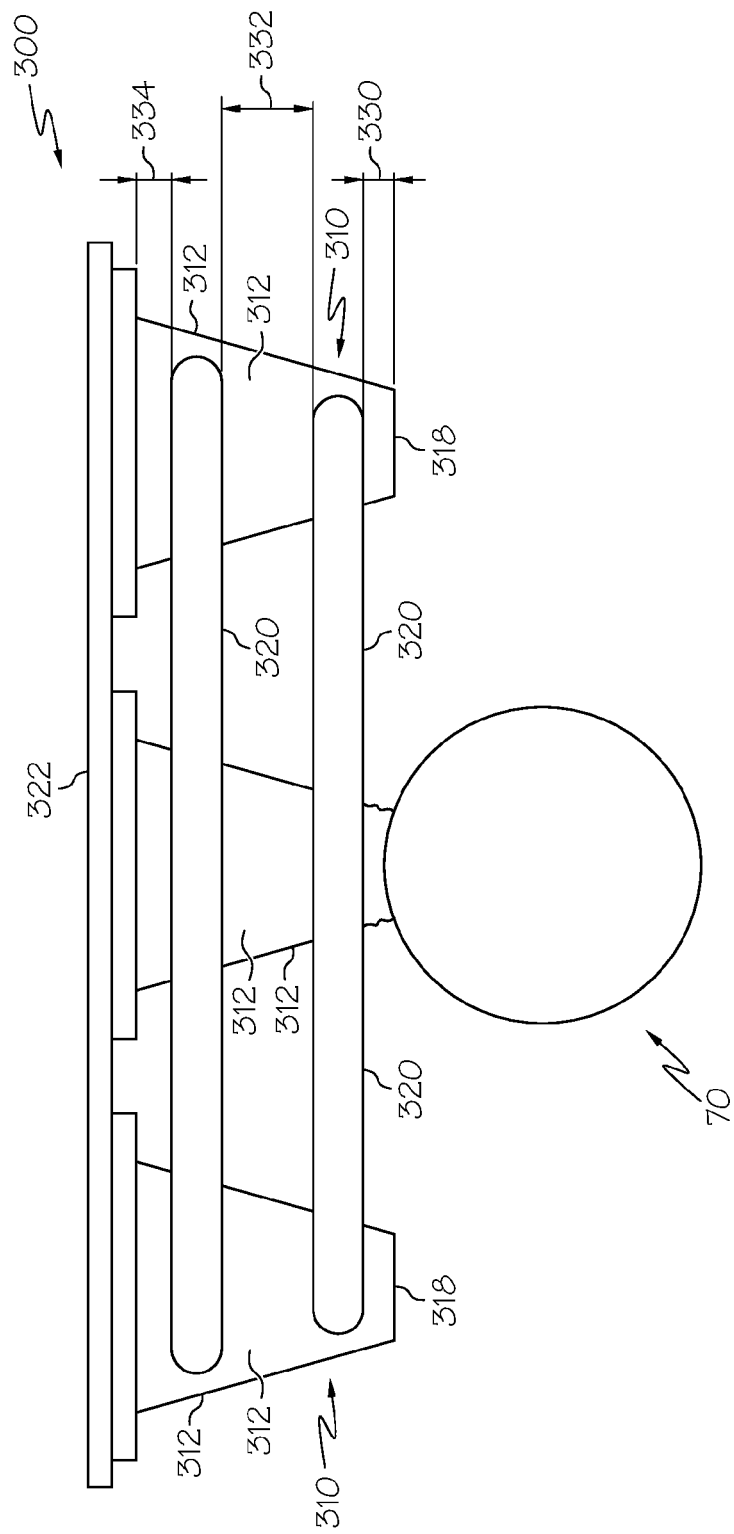
FIG. 15 schematically depicts a top view of the impact protection structure for a vehicle of FIG. 14 undergoing an impact event with a blunt-object barrier.
Figure 16:
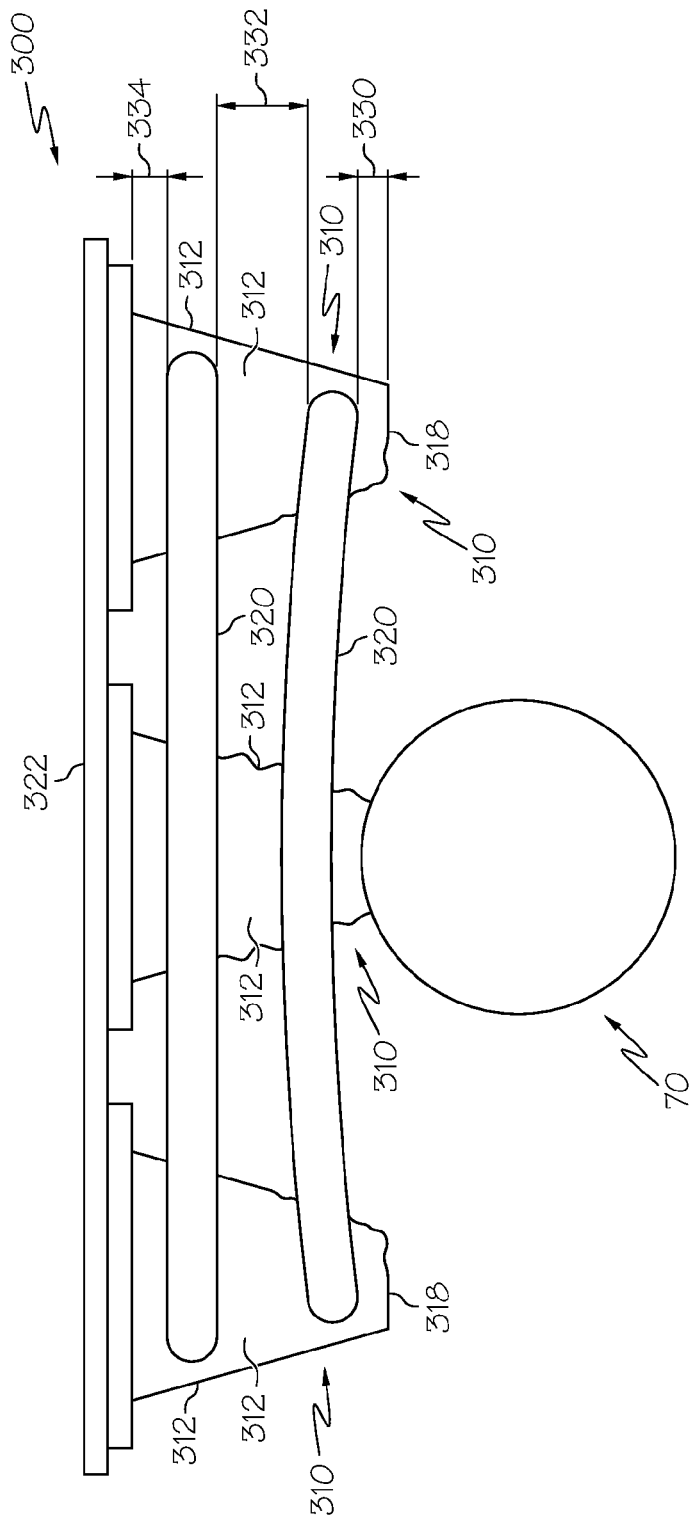
FIG. 16 schematically depicts a top view of the impact protection structure for a vehicle of FIG. 14 undergoing an impact event with a blunt-object barrier.
Figure 17:
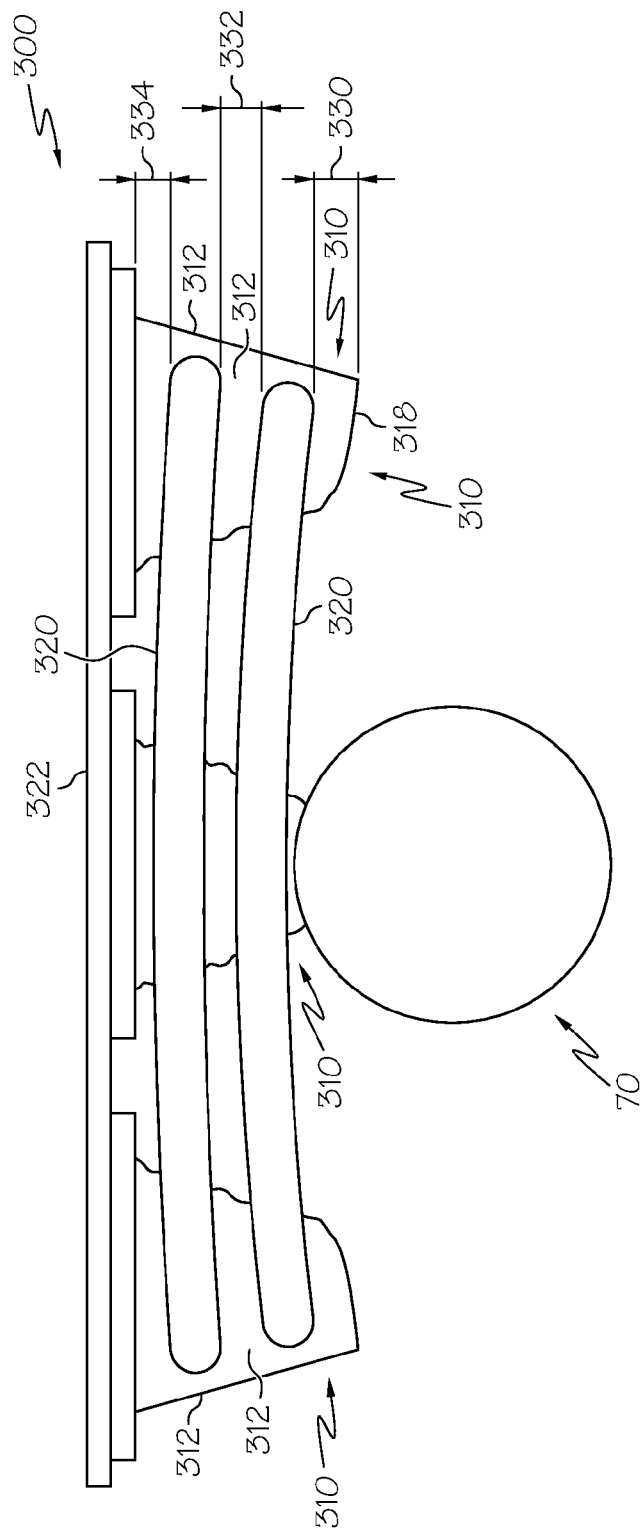
FIG. 17 schematically depicts a top view of the impact protection structure for a vehicle of FIG. 14 undergoing an impact event with a blunt-object barrier.

Referring now to FIGS. 15-17, an impact event between an impact protection structure 300 having a plurality of elongated frustums 310 and a blunt-object barrier 70 is depicted. When a vehicle having the impact protection structure 300 that includes a plurality of elongated frustums 310 is subject to an impact load from a blunt-object barrier 70, the elongated frustums 310 proximate to the blunt-object barrier 70 contact the blunt-object barrier 70 and being to deform. As the elongated frustums 310 elastically and/or plastically deform, the load applied to the elongated frustums 310 exceeds the buckling load limit of the elongated frustums 310, causing the elongated frustums 310 to buckle inwards towards the battery support tray 90 due to the compressive stresses applied by the blunt-object barrier 70. Depending on the location of the blunt-object barrier 70 relative to the elongated frustums 310, a load that is non-orthogonal to the distal contact face 318 may tend to bend the elongated frustum 310, causing it to collapse in a direction corresponding to the direction of the load. As the elongated frustum 310 continues to buckle, the tie straps 320 may distribute the load from the elongated frustum 310 contacting the blunt-object barrier 70 to elongated frustums 310 that are spaced apart from the blunt-object barrier 70. The tie straps 320 stabilize each of the elongated frustums 310 by distributing a portion of the load associated with the impact with the blunt-object barrier 70 to other elongated frustums 310 in the impact protection structure 300.

Referring now to FIG. 15, the impact protection structure 300 includes three elongated frustums 310 that are coupled to one another by tie straps 320 at two positions along the top and bottom lateral faces 312. The tie straps 320 segregate the elongated frustums 310 into a plurality of discrete deformation zones. A first deformation zone 330 is positioned between the contact faces 318 of the elongated frustums 310 and the outer-most tie strap 320. A second deformation zone 332 is positioned between the outer-most tie strap 320 and the inner-most tie strap 320. The third deformation zone 334 is positioned between the inner-most tie strap 320 and the mounting bracket 322 of the impact protection structure 300. Referring to FIG. 15, when the elongated frustum 310 positioned in the center of the impact protection structure 300 is contacted by a blunt object barrier 70, the elongated frustum 310 contacting the blunt-object barrier 70 begins to deform in the first deformation zone 330.

Referring now to FIG. 16, as the blunt-object barrier 70 continues to travel towards the mounting bracket 322, the elongated frustum 310 contacting the blunt-object barrier 70 continues to collapse and deform. As the elongated frustum 310 contacting the blunt-object barrier 70 collapses in the first and second deformation zones 330, 332, the outer-most tie strap 320 applies a force to the non-contacting elongated frustums 310, causing the non-contacting elongated frustums 310 to deform. The tie strap 320 transfers energy caused by the impact between the blunt-object barrier 70 and the contacting elongated frustum 310 to the non-contacting elongated frustums 310, such that the non-contacting elongated frustums 310 dissipate energy associated with the impact. The deformation of the non-contacting elongated frustums 310 may be positioned in the same deformation zone as that of the contacting elongated frustum 310. Thus, deformation of the contacting elongated frustum 310 in the first and second deformation zones 330, 332 may cause deformation of the non-contacting elongated frustums 310 in the first and second deformation zone 332. Further, the tie strap 320 may provide structural reinforcement to local regions of the elongated frustums 310. The deformation of the elongated frustums 310 is limited to occur in the first and second deformation zones 330, 332, while local regions of the elongated frustums 310 supported by the tie straps 320 remain undeformed.

Referring now to FIG. 17, the contacting and non-contacting elongated frustums 310 continue to deform as the elongated frustums 310 dissipate energy associated with the impact with the blunt-object barrier 70. As depicted in FIG. 17, the contacting frustum 310 deforms in the first, second, and third deformation zones 330, 332, 334 as the blunt-object barrier 70 approaches the mounting bracket 322. The outer-most and inner-most tie straps 320 apply loads to the non-contacting elongated frustums 310 as to dissipate energy associated with the impact. Further, as is depicted in FIG. 17, the deformation of the non-contacting elongated frustums 310 may be positioned in the same deformation zone as that of the contacting elongated frustum 310. Thus, deformation of the contacting elongated frustum 310 in the first, second, and third deformation zones 330, 332, 334 may cause deformation of the non-contacting elongated frustums 310 in the first, second, and third deformation zones 330, 332, 334.

Figure 18:
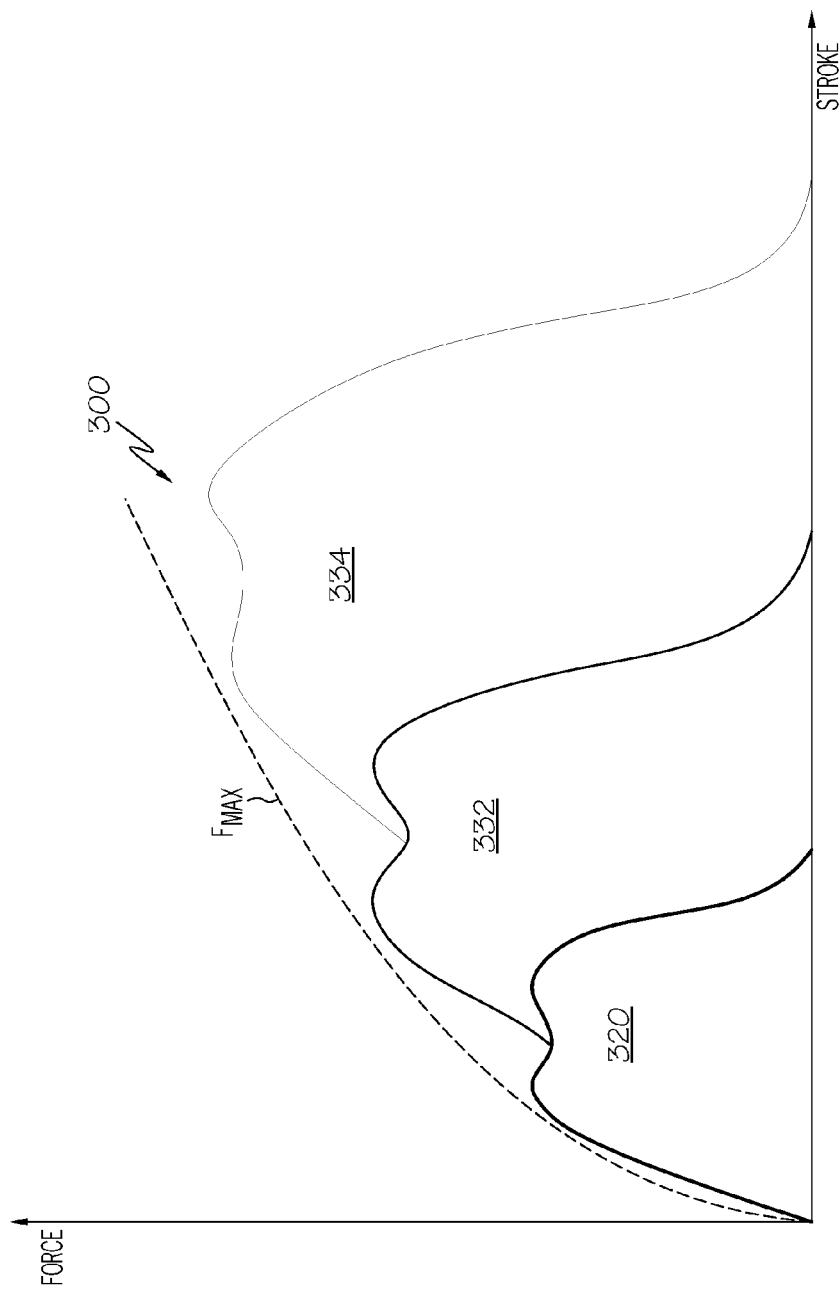
FIG. 18 hypothetically depicts a force-stroke plot diagrammatically depicting deformation of an impact protection structure undergoing an impact with a blunt-object barrier according to one or more embodiments shown and described herein.

Referring now to FIG. 18, a hypothetical force-stroke plot diagrammatically depicts deformation of the impact protection structure 300 undergoing an impact with a blunt-object barrier. The individual curves of the force-stroke plot represent the energy dissipation of the first, second, and third deformation zones 330, 332, 334 as the impact protection structure 300 undergoes the impact event. Because of the taper of the elongated frustums 310 from the distal contact face 318 to the mounting bracket 322, the first, second, and third deformation zones 330, 332, 334 have progressively increasing energy dissipation capability, which is reflected in the ability of the elongated frustums 310 to resist progressively greater deformation force as the first, second, and third deformation zones 330, 332, 334 buckle. Without being bound by theory, the even taper of the elongated frustums 310 provide force-stroke curves having approximately the same shape for the first, second, and third deformation zones 330, 332, 334, or are "symmetrical." The symmetric force-stroke curves reflect that maximum force $F_{MAX}$ dissipated by the impact protection structure 300 is progressive and does not containing sharp changes in slope, representative of sudden impact loads being transferred to the vehicle. The hypothetical force-stroke plot depicting the response of the impact protection structure 300 with a blunt-object barrier (i.e., increase in force with each successive buckle and symmetry of deformation zones 330, 332, 334) reflects computational results shown by nonlinear finite element analysis of the described shape.

It should now be understood that impact protection structures may include localized energy dissipation structures that may be used in conjunction with other energy absorbing structures as to provide a local increase in energy dissipation capability of the energy absorbing structures. Impact protection structures that incorporate localized energy dissipation structures use material more efficiently, such that a weight penalty associated with increase energy dissipation is managed. Impact protection structures including localized energy dissipation structures according to the present disclosure may be positioned at a variety of orientations on the vehicle to provide increased protection from impact with blunt-object barriers in a variety of vehicle orientations.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. An impact protection structure for a vehicle impacting a blunt-object barrier, the impact protection structure comprising:
 a support structure of the vehicle;
 an energy absorbing rail coupled to the support structure, the energy absorbing rail extending an energy absorbing rail length and comprising a plurality of lumens and a relief zone that exposes a septum positioned between two adjacent lumens along a portion of a length of the energy absorbing rail; and a localized energy dissipation structure coupled to the energy absorbing rail, the localized energy dissipation structure extending a localized energy dissipation structure length less than the energy absorbing rail length, wherein the localized energy dissipation structure is positioned adjacent to the relief zone such that the localized energy dissipation structure deforms when the localized energy dissipation structure is impacted by the blunt-object barrier.

2. The impact protection structure of claim 1, wherein the localized energy dissipation structure is positioned inside one of the lumens of the energy absorbing rail such that the localized energy dissipation structure deforms with the energy absorbing rail when the energy absorbing rail is impacted by the blunt-object barrier.

3. The impact protection structure of claim 1, wherein the energy absorbing rail comprises:

an interior rail coupled to the support structure, the interior rail extending an interior rail length; and an exterior rail coupled to the interior rail, the exterior rail comprising a plurality of interior lumens.

4. The impact protection structure of claim 3, wherein the interior rail comprises a predetermined interior buckling load limit and the exterior rail and the localized energy dissipation structure have a predetermined exterior buckling load limit, wherein the exterior buckling load limit is less than the interior buckling load limit.

5. The impact protection structure of claim 1, wherein the localized energy dissipation structure comprises a plurality of energy dissipation lumens extending along the localized distance of the localized energy dissipation structure.

6. The impact protection structure of claim 1, wherein the localized energy dissipation structure is coupled to the energy absorbing rail at a plurality of securement positions along the localized distance.

7. The impact protection structure of claim 6, wherein the localized energy dissipation structure is detached from the energy absorbing rail at a plurality interstitial positions spaced between the plurality of securement positions.

8. An impact protection structure for a vehicle impacting a blunt-object barrier, the impact protection structure comprising:

a support structure of the vehicle;

an energy absorbing rail coupled to the support structure, the energy absorbing rail extending an energy absorbing rail length and comprising a plurality of lumens and a relief zone that exposes a septum positioned between two adjacent lumens along a portion of a length of the energy absorbing rail; and a localized energy dissipation structure coupled to the energy absorbing rail, the localized energy dissipation structure extending a localized energy dissipation structure length less than the energy absorbing rail length, wherein the localized energy dissipation structure is positioned adjacent to the relief zone and is inserted into a lumen in the relief zone that is enclosed such that the localized energy dissipation structure deforms when the localized energy dissipation structure is impacted by the blunt-object barrier.

9. The impact protection structure of claim 8, wherein the energy absorbing rail comprises:

an interior rail coupled to the support structure, the interior rail extending an interior rail length; and an exterior rail coupled to the interior rail, the exterior rail comprising a plurality of interior lumens.

10. The impact protection structure of claim 9, wherein the interior rail comprises a predetermined interior buckling load limit and the exterior rail and the localized energy dissipation structure have a predetermined exterior buckling load limit, wherein the exterior buckling load limit is less than the interior buckling load limit.

11. The impact protection structure of claim 8, wherein the localized energy dissipation structure comprises a plurality of energy dissipation lumens extending along the localized distance of the localized energy dissipation structure.

12. The impact protection structure of claim 8, wherein the localized energy dissipation structure is coupled to the energy absorbing rail at a plurality of securement positions along the localized distance.

13. The impact protection structure of claim 12, wherein the localized energy dissipation structure is detached from the energy absorbing rail at a plurality interstitial positions spaced between the plurality of securement positions.

\* \* \* \* \*

UNITED STATES PATENT AND TRADEMARK OFFICE
CERTIFICATE OF CORRECTION

PATENT NO.         : 8,608,230 B2
APPLICATION NO.    : 13/446810
DATED              : December 17, 2013
INVENTOR(S)        : Jonathan Richard Young et al.

It is certified that error appears in the above-identified patent and that said Letters Patent is hereby corrected as shown below:

On the Title Page, item (73) Assignee: Change name of Assignee "Tesla Motor, Inc." to "Tesla Motors, Inc."

Signed and Sealed this
Twenty-first Day of April, 2015

Michelle K. Lee
*Director of the United States Patent and Trademark Office*

UNITED STATES PATENT AND TRADEMARK OFFICE
CERTIFICATE OF CORRECTION

| | |
|---|---|
| PATENT NO. | : 8,608,230 B2 |
| APPLICATION NO. | : 13/446810 |
| DATED | : December 17, 2013 |
| INVENTOR(S) | : Young et al. |

It is certified that error appears in the above-identified patent and that said Letters Patent is hereby corrected as shown below:

This certificate supersedes the Certificate of Correction issued April 21, 2015. The certificate is vacated since petition to correct assignee under 3.81 (b) was not acted on by the Office of Petitions. The Certificate of Correction was published in error and should not have issued.

Signed and Sealed this
Seventh Day of July, 2015

Michelle K. Lee
*Director of the United States Patent and Trademark Office*